Jan. 8, 1952     H. HAWKINS     2,581,482
BALL NUT
Filed Feb. 27, 1948
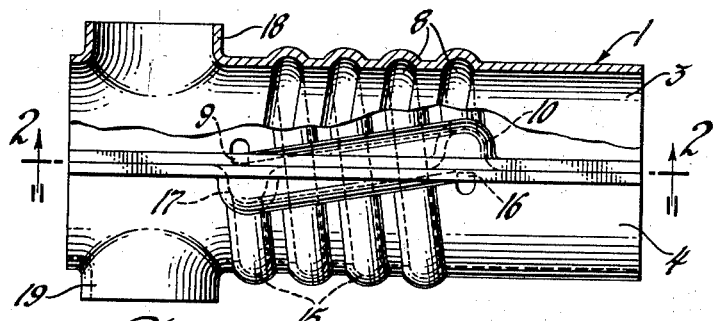
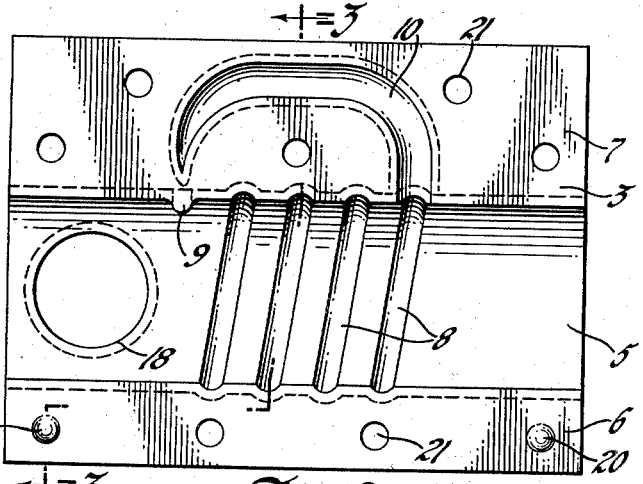
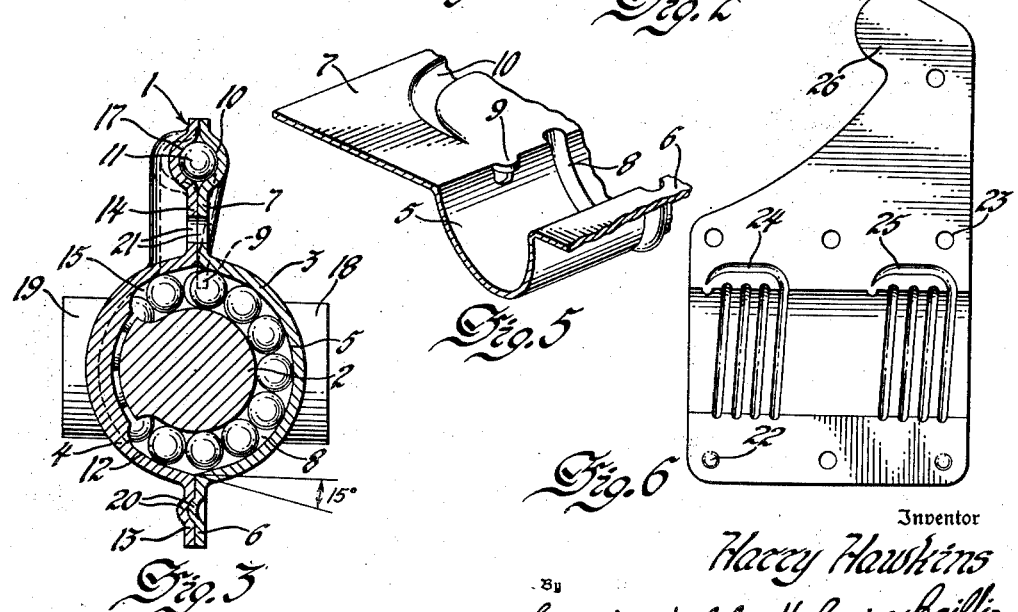
Inventor
Harry Hawkins
By Spencer, Jehlitz, Helmig & Baillio
Attorneys Patented Jan. 8, 1952

2,581,482

UNITED STATES PATENT OFFICE 2,581,482

BALL NUT

Harry Hawkins, Saginaw, Mich., assignor to General Motors Corporation, Detroit, Mich., a corporation of Delaware Application February 27, 1948, Serial No. 11,442

6 Claims. (Cl. 74—459)

This invention relates to improvements in ball bearing screw and nut gears of the type in which the screw and the nut are provided with corresponding helical grooves forming a helical passage containing balls which constitutes the screw-thread connection between the screw and nut.

Though ball-bearing screw and nut gears are now used on some jacks, steering gears and other applications where the high cost of machining the ball nut is not prohibitive to commercial use, they have not been used generally to replace screw and nut gears employing conventional threads.

The primary object of this invention is to provide a ball-bearing screw and nut suitable for low cost production.

Another object is to provide a ball-bearing nut construction which may be formed by stamping sheet metal to form two congruent halves which are assembled in reverse relation to form a complete nut.

Other objects and advantages will be apparent in the following detailed description of the preferred embodiment.

In the drawing:

Figure 1 is an elevation view in partial section of the two-part ball nut.

Figure 2 is an elevation of Figure 1 on the line 2—2 showing one part of the two-part ball nut.

Figure 3 is a section of Figure 2 on the line 3—3 showing the two-part ball nut with the conventional screw and balls.

Figure 4 is an enlarged fragmentary cross section of a ball bearing and the groove in the screw and nut.

Figure 5 is a partial perspective view showing the ball deflector tongue.

Figure 6 is a modification showing a two-passage ball nut for a screw jack.

The stamped two-part ball nut 1 constructed in accordance with this invention is suitable for use on a conventional helically-grooved screw 2 shown in cross section in Figure 3. The screw 2 may be made in any conventional manner as shown, for example, in United States Patent 2,380,662 to Means.

The ball nut 1 is made of two similar sheet metal parts 3 and 4. The helical grooves 8 and 15 which, in conjunction with the groove on screw 2, provides a helical ball passage and the return passage grooves which, in conjunction with a similar groove on the other part, forms the return passage for the recirculation of the balls, are stamped or formed in the sheet metal. The general form of parts 3 and 4 and the form of the grooves therein may be the same. Since one of the parts 3 or 4 must be reversed end for end when assembled to form the nut 1, the means on the nut employed as part of the connection to the operated element is located on opposite ends in the parts 3 and 4.

In accordance with the invention the ball nut 1, shown in Figures 1 and 3, is made of two similar stamped parts 3 and 4. Referring to Figure 2, the sheet metal is first formed to provide a semi-cylindrical section 5 which surrounds half of the screw 2 and two flanges 6 and 7 in the plane of the edge elements of the semi-cylindrical portion. The flanges 6 and 7 increase the rigidity of the nut 1 and provide means to secure the two parts 3 and 4 together. In the cylindrical section 5 a series of grooves 8 of a depth slightly less than half the diameter of a ball 11 are formed at the same helix angle and spacing or lead as the grooves in the helical screw 2. These grooves 8 form half of the helical groove found in the complete nut 1.

The ball deflector tongue 9 is punched from the wall of the cylindrical portion 5 and bent into the plane of the flange 7. The tongue is spaced from the last helical groove a distance equal to the lead space between the helical grooves and is shaped to extend into the helical groove on the screw 2 to guide the balls either to or from the helical grooves.

The return passage groove 10 is formed in the flange 7 and connects the first helical groove 8, which is shown on the right side in Figure 2, with the ball deflector tongue 9 by a curve which is preferably symmetrically curved about a transverse center line equidistant between the first helical groove 8 and the tongue 9, as shown in Figure 2. The groove 10 at the point where it connects with the first helical groove 8 has a depth equal to the diameter of a ball 11 and a suitable clearance, and then tapers gradually towards the other end, so that just before it reaches the tongue 9 the groove terminates.

The other half 4 of the ball nut 1 is formed in the same manner as stamped part 3. As shown in Figure 3 it has a semi-cylindrical portion 12 and flanges 13 and 14. The semi-cylindrical portion 12 has grooves 15 which are exactly the same as the grooves 8, and a deflector tongue 16 located and formed in the same manner as deflector tongue 9. These grooves must be the same or congruent so that when the parts 3 and 4 are assembled in reverse relationship these grooves form a regular helical groove. The return passage groove 17 is preferably a symmetrical curve connecting the first groove 15 and the tongue 16, and varies in depth from the full diameter of a ball plus clearance at the end adjacent said groove 15 to zero depth adjacent the tongue 16 in the same manner as groove 10. The shape of the two parts 3 and 4 and the configuration of the grooves therein are exactly the same in both halves of the ball nut 1 and may be formed with the same dies. The two parts 3 and 4 may then be assembled in face to face relationship but with one part reversed endwise with regard to the other and secured together to form the ball nut.

A connection may be provided between the ball nut 1 and the connected machine element, by forming a pair of cylindrical flanges or sockets 18 and 19 out of the cylindrical portions 5 and 12 respectively of the parts 3 and 4. These sockets 18 and 19 are spaced equidistant from the transverse centerline but at opposite ends of the parts 3 and 4, so that when one of the parts is reversed end for end the sockets are in diametrically opposed relation. The sockets 13 and 19 may be employed as an integral trunnion or as a socket for a separate trunnion.

Suitable locating projections 20 and bolt holes 21 may be formed in the parts 3 and 4 symmetrically about the transverse centerline. One of the parts 3 or 4 is then reversed end for end and the two parts are assembled in face to face relationship. After the locating projections 20 are aligned the parts are secured together by suitable securing means such as bolts or rivets in holes 21 or welding.

When in the assembled position the series of grooves 8 and 15 combine to form a continuous helical groove. The return passage grooves 10 and 17, being symmetrically curved about the transverse centerline of the threaded portion of the nut, match when positioned in opposed relation and form a return passage for the balls. The large end of each groove will be opposite the small end of the other groove. In the central portion of the passage the grooves 10 and 17 will be about equal in size. A deflector tongue 9 and 16 on each part 3 and 4 blocks one end of the helical groove 8—15 opposite the large return passage groove 10 or 17 in the other part.

Thus the balls 11 circulate in either direction through the helical passage formed by the matching grooves in the screw and nut and are guided by either deflector finger 9 or 16 at one end of the passage into the return passage. The balls enter the return passage which initially consists of the groove in one part 3 or 4 and are gradually transferred to the groove in the other part. As the balls enter the helical groove the other deflector finger 9 or 16 guides the balls in the proper direction.

Though four grooves are shown in the drawing, it will be apparent that the number of grooves may be varied. A reduction in the number of grooves or turns of the helical passage will reduce the load capacity of the bearing, while an increase in the number of grooves or turns of the helical passage will reduce the efficiency of the ball nut gear by retarding the circulation of the balls through the passage.

The groove 8 has a gothic-arch cross-sectional shape as shown in Figure 4 to reduce the end play under thrust. In the conventional ball nut and screw the grooves have a larger diameter than the balls to provide clearance. Under normal axial load or thrust the nut will move axially with respect to the screw, so that the ball will contact the grooves at two opposed points on the thrust line which is at 45° to the screw axis. With the gothic-arch groove 8 the groove normally contacts the ball at the thrust line. Thus less endwise movement is required for the ball 11 to assume the load. The ball normally has a small area of contact with the groove and thus there is little friction resistance to the circulation of the balls.

In a two-part bearing nut as contemplated by this invention, where the parts are not machined in the assembled position, small variation in size and alignment will produce an uneven joint and thus cause serious wear. In order to avoid this wear at the meeting edges of the grooves 8 and 15 they are enlarged or relieved at each end to remove the load on the balls as they cross the joint. As shown in Figure 3 the grooves are relieved from a true circle to coincide with a 15° tangent at the meeting edges.

Figure 6 shows a modified form made from two stampings in the same manner as the ball nut shown in Figures 1 to 5. Similar extruded dowels 22 for locating the stampings and apertures 23 for securing the stampings are employed. However, in this modification two separate ball passages 24 and 25, each formed in the same manner as in the first form, are employed to produce a ball nut with greater thrust capacity. If the ball passage grooves are the same and are symmetrically located about a transverse centerline therebetween, both halves may be formed exactly the same. One or preferably both of the flanges of the stampings are extended and shaped to provide a hook 26, as shown in Figure 6, suitable to employ the ball nut as the nut and hook portion of a bumper jack. Where both flanges extend as a hook, they must be formed in reverse relation to the transverse centerline. Where the means employed to connect the ball nut to the operated element may be located symmetrically about the transverse centerline, such as a pin or trunnion on the centerline between passages 24 and 25 or on the flange or rack teeth on the flange, both the grooves and the connecting means may be formed the same. Thus the same stamping could be used for either half of the ball nut.

These specific embodiments of the invention are merely illustrative of the preferred form. Numerous modifications of the invention may be made within the scope of the claims.

I claim:

1. A ball nut consisting of two semi-cylindrical parts, flanges extending from a straight edge of said parts, said flanges being secured together in face-to-face relationship, a continuous helical groove in the inner surface of said parts, a return passage consisting of a groove in each flange, said grooves tapering in depth from substantially the ball diameter to zero and said tapered grooves being reversely disposed in face-to-face relationship.

2. A ball nut consisting of two semi-cylindrical thin wall parts, flanges extending radially from the straight edges of said thin wall parts, said flanges being secured together in face to face relationship, said parts forming a cylinder, a continuous helical groove half a ball diameter deep and having a uniform pitch in the inner surface of said semi-cylindrical thin wall parts, the helical groove being enlarged at the edge of each of said parts to relieve the load on the balls as they move from one part to another, the helical groove portion in each of said parts being identical, a return passage groove in each of a pair of face to face flanges, said return passage grooves extending from the edge of the flange at the first end helical groove at one end of the helix and extending through the center portion of the flange to the edge of the flange a distance equal to the lead of said helix past the last helical groove at the other end of the helix, said return passage grooves tapering from a full ball diameter at said one end to substantially zero depth at said other end, said return passage grooves being identical and reversely positioned in face to face relationship to provide a uniform depth ball groove, each of said grooves having a symmetrical shape about its transverse axis, a U-shaped cut in said cylindrical parts adjacent the zero depth end of said return groove defining a tongue, said tongue being bent substantially into the plane of said flanges to provide a stop for the balls.

3. A ball nut consisting of two parts secured together, a plurality of grooves of the same uniform depth formed in each part, said grooves being positioned to form a continuous helical groove of uniform cross-sectional area for the balls, and said grooves being enlarged beyond said normal uniform cross-sectional area at the meeting edges of said parts to relieve the load on the balls.

4. The invention defined by claim 1, said continuous helical groove in the inner surface of said parts having a uniform cross-sectional area and said grooves being enlarged beyond said normal uniform cross-sectional area at the meeting edges of said parts to relieve the load on the balls as the balls move from one part to the other part of the ball nut.

5. The invention defined by claim 1, and a ball stop tongue cut and bent out of the wall of one of said parts.

6. The invention defined by claim 3, and a ball stop tongue cut and bent out of the wall of one of said parts.

HARRY HAWKINS.

REFERENCES CITED

The following references are of record in the file of this patent:

UNITED STATES PATENTS

| Number | Name | Date |
| --- | --- | --- |
| 590,929 | Youngken | Sept. 28, 1897 |
| 601,451 | Stevenson | Mar. 29, 1898 |
| 1,704,031 | Boehm | Mar. 5, 1929 |
| 2,236,492 | Costello | Mar. 25, 1941 |